United States Patent [19]
McNulty

[11] Patent Number: 5,626,126
[45] Date of Patent: May 6, 1997

[54] TRANSPORTABLE BARBEQUE APPARATUS

[76] Inventor: Bill McNulty, P.O. Box 511, Stevensville, Mont. 59870

[21] Appl. No.: 431,963

[22] Filed: May 1, 1995

[51] Int. Cl.⁶ .................................................... F24C 1/16
[52] U.S. Cl. .................... 126/276; 126/24; 126/25 R; 126/30
[58] Field of Search ...................... 126/276, 275 R, 126/273 A, 59, 24, 30, 29, 25 R, 265, 268; 296/24.1

[56] References Cited

U.S. PATENT DOCUMENTS

| | | | |
|---|---|---|---|
| 3,032,783 | 5/1962 | Swanson, Jr. | 126/24 X |
| 3,060,920 | 10/1962 | Dibert | 126/276 |
| 3,406,999 | 10/1968 | Kozicki | 296/156 |
| 3,498,284 | 3/1970 | Swaddey | 126/41 |
| 3,692,351 | 9/1972 | Christopher et al. | 296/23 R |
| 3,759,242 | 9/1973 | Mauger | 126/25 |
| 4,089,554 | 5/1978 | Myers | 296/24 |
| 4,347,830 | 9/1982 | Runyan | 126/9 R |
| 4,381,069 | 4/1983 | Kreck | 224/42.44 |
| 4,518,189 | 5/1985 | Belt | 126/24 X |
| 4,729,535 | 3/1988 | Frazier et al. | 126/24 X |
| 4,932,391 | 6/1990 | Bierdeman | 126/30 |
| 4,971,237 | 11/1990 | Davis | 224/42.06 |
| 5,029,740 | 7/1991 | Cox | 224/42.01 |
| 5,029,935 | 7/1991 | Dufrancatel | 296/156 |
| 5,181,822 | 1/1993 | Allsop et al. | 414/462 |
| 5,190,195 | 3/1993 | Fulhart et al. | 224/42.03 B |
| 5,411,011 | 5/1995 | Teta | 126/24 X |

*Primary Examiner*—Larry Jones
*Attorney, Agent, or Firm*—John F. Sieberth

[57] ABSTRACT

The apparatus is multifunctional in that it can be transported, readily and safely, from place to place by means of a vehicle. The transportable barbecue apparatus is detachably attachable to a land vehicle having connection means at the rear thereof, such as a receiver hitch on the rear bumper. The apparatus comprises a barbecue cooker and an support arm, most preferably an articulated support arm, having an inner end portion whereby the arm can be detachably secured at its inner end portion to the connection means so that the apparatus is held above ground level at the rear of the vehicle. Preferably, when the arm is detachably secured in this manner, the arm projects rearwardly from the vehicle in a plane that is substantially perpendicular to the rear bumper. The apparatus, supported by the arm, can be utilized with a stand whereby it becomes a stand alone barbecue cooker.

13 Claims, 7 Drawing Sheets

TRANSPORTABLE BARBEQUE APPARATUS

TECHNICAL FIELD

This invention relates to novel multifunctional apparatus especially adapted for outdoor cooking operations. More particularly, the invention pertains to novel and eminently useful barbecue apparatus which can be transported, readily and safely, from place to place by means of a vehicle.

BACKGROUND

In the recreational field there are many situations in which it is desired to have hot food available. Examples include such outdoor activities as tailgate parties, picnics, camping, hunting, fishing, sports events, and recreational travel. In instances such as these it is commonplace to build a camp fire for cooking, use a portable stove or grill designed for outdoor cooking, or seek out permanently installed outdoor grill facilities.

Likewise, it is often desired to stay at home and enjoy an evening barbecue cook-out with family or friends. For this purpose use is typically made of barbecue grills such as are kept in a store room, in a garage or in the basement.

A most welcome contribution to the recreational field would be a device which can serve all of the above outdoor cooking needs.

SUMMARY OF THE INVENTION

This invention is deemed to fulfill this objective by providing apparatus which can be effectively used either at home or away. Moreover, in addition to its versatility and multifunctionality, the apparatus is characterized by its ease and safety of transport and use.

Pursuant to this invention there is provided transportable barbecue apparatus detachably attachable to a land vehicle having connection means at the rear thereof, such as a receiver hitch attached to the rear bumper of the vehicle. The apparatus comprises a barbecue cooker and an support arm having an inner end portion whereby the arm can be detachably secured at its inner end portion to the connection means so that the apparatus is held above ground level at the rear of the vehicle. Preferably, when the arm is detachably secured in this manner, the arm projects rearwardly from the vehicle in a plane that is substantially perpendicular to the rear bumper. One embodiment comprises apparatus suitable for use with a vehicle having a tailgate. In this embodiment the support arm is configured and adapted to support the cooker in a cooking position above ground level spaced from the vehicle a sufficient distance to enable the tailgate to be raised and lowered without physical interference with the apparatus. Another embodiment comprises apparatus suitable for use with a vehicle having a liftback. In this case the support arm is configured and adapted to support the cooker in a cooking position above ground level spaced from the vehicle a sufficient distance to enable the liftback to be raised and lowered without physical interference with the apparatus. A preferred embodiment is a universal apparatus in the sense that it can be used either with a vehicle having a tailgate or a liftback, and in either case, the support arm is configured and adapted to support the cooker in a cooking position above ground level spaced from the rear of the vehicle a sufficient distance to enable the tailgate or the liftback (as the case may be) to be raised and lowered without physical interference with the apparatus.

More preferably, the arm of the apparatus is constructed and configured such that the cooker can be secured above ground level (i) in a transport position proximate to, but spaced from the back end of the vehicle during vehicular travel, and (ii) in a cooking position in which the cooker is further away from the back end of the vehicle than when in the transport position.

In accordance with another of its preferred embodiments, this invention provides transportable barbecue apparatus for detachable attachment to a hitch or other suitable connection means associated with the rear bumper of a land vehicle such as a pickup truck, recreational vehicle, van, or the like. The barbecue apparatus comprises a barbecue cooker or grill and an articulated support arm having an inner end portion and an outer end portion. The arm is adapted to be detachably secured at its inner end portion to the hitch or other connection means associated with the rear bumper of the vehicle. In addition, the arm is either secured, or adapted to be detachably secured, at its outer end portion to the cooker. When detachably secured to the hitch or other connection means and to the cooker, the articulated arm extends rearwardly in a planar zone substantially perpendicular to rear bumper thereby securing the cooker in a preselected position above ground and spaced apart from the vehicle.

In one preferred form, the articulated arm comprises:

a) a first segment extending from the foregoing inner end portion to a back end portion, b) a second segment extending from its own front end portion to the foregoing outer end portion, and c) a channel affixed to the first segment proximate the back end portion thereof to extend upwardly and rearwardly at an angle from the vertical to receive and detachably secure the second segment proximate the front end portion thereof in at least one upwardly extending position.

In another preferred embodiment, the channel, c) above, is adapted to receive and detachably secure the second segment in at least two upwardly extending positions. A first such position extends upwardly to the rear of vertical. A second such position extends upwardly either vertically or at a smaller angle to the front or rear of vertical. In this way the cooker can be held relatively close, but spaced from, the back end of the vehicle during transport and alternatively, relatively remote from the back end of the vehicle during use. In both cases the cooker is held above ground level by the articulated arm. By providing a suitable stand and connector, the cooker and articulated arm can be detached from the vehicle bumper connection and supported on the stand in position for use at any desired location apart from the vehicle. Thus the provision of a support stand detachably attachable to the articulated arm enables the cooker to be used as a free standing unit when the articulated arm is not secured to the connection on or associated with the rear bumper.

By suitably designing the length of the segments of the articulated arm and by suitably regulating the angular disposition of the outer segment of the arm, the apparatus of this invention permits essentially unencumbered access to the tailgate or liftback of the vehicle even when attached to the vehicle and while in use for cooking. In short, the tailgate or liftback of the vehicle can be raised and lowered without physical interference with the apparatus.

In preferred forms, the cooker includes a pit section for receiving solid fuel, a cooking grate disposed above the pit section, and a lockable lid having open and closed positions whereby the cooker can be completely closed during transport. This eliminates, or at least greatly reduces, such problems as spilled coals; hot coal disposal; and theft or loss of the grate, utensils and any other supplies stored within the closed cooker when not in use. Moreover, the entire apparatus of this invention can be locked in place on the vehicle to reduce the risk of theft.

These and other embodiments, features, and advantages of this invention will become still further apparent from the ensuing description, appended claims and accompanying drawings. In the drawings like numerals are used to represent like parts among the several figures.

FURTHER DESCRIPTION OF PREFERRED EMBODIMENTS

As depicted, the barbecue apparatus 10 comprises a barbecue cooker 15 and an articulated support arm 20 which enables the apparatus to be detachably secured to a land vehicle 25 by means of receiver hitch 30 suitably connected to the rear bumper 27. Hitch 30 supports apparatus 10 above ground level for transport and, when desired, hitch 30 also supports apparatus 10 above ground level for cooking use as well (note FIG. 2). Alternatively, cooker 15 and articulated support arm 20 can be detached from the vehicle and detachably secured onto stand 12 whereby the apparatus can be used as a free-standing unit (note FIG. 3).

Articulated arm 20 in the form depicted is composed of an inner segment 22 and an outer segment 24. The inner end portion of segment 22 is sized and configured to slidably fit into receiver hitch 30. Hitch 30 in turn can be suitably secured as by bolting or welding onto the underside of rear bumper 27. The inner walls of hitch 30 define a channel of sufficient length to enable the entire apparatus to be securely supported thereby above ground level. Detachable connection between segment 22 and hitch 30 is effected by fastening a bolt or a threaded pin 34 through matching apertures in the wall of hitch 30 and the inner end portion of segment 22, as is indicated in FIGS. 1 and 2.

Outer segment 24 can be connected to the underside of cooker 15 in any of a number of ways. In the form depicted in FIG. 4, this connection involves sleeve 36 which depends forwardly at an angle from the underside of cooker 15 and is suitably connected thereto as by welding. Sleeve 36 is sized and configured to slidably receive the outer end portion of outer segment 24 and the connection is secured by fastening a bolt or a threaded pin through matching apertures 38 and 39 in the wall of sleeve 36 and in the outer end portion of segment 24, respectively.

Figure 4:
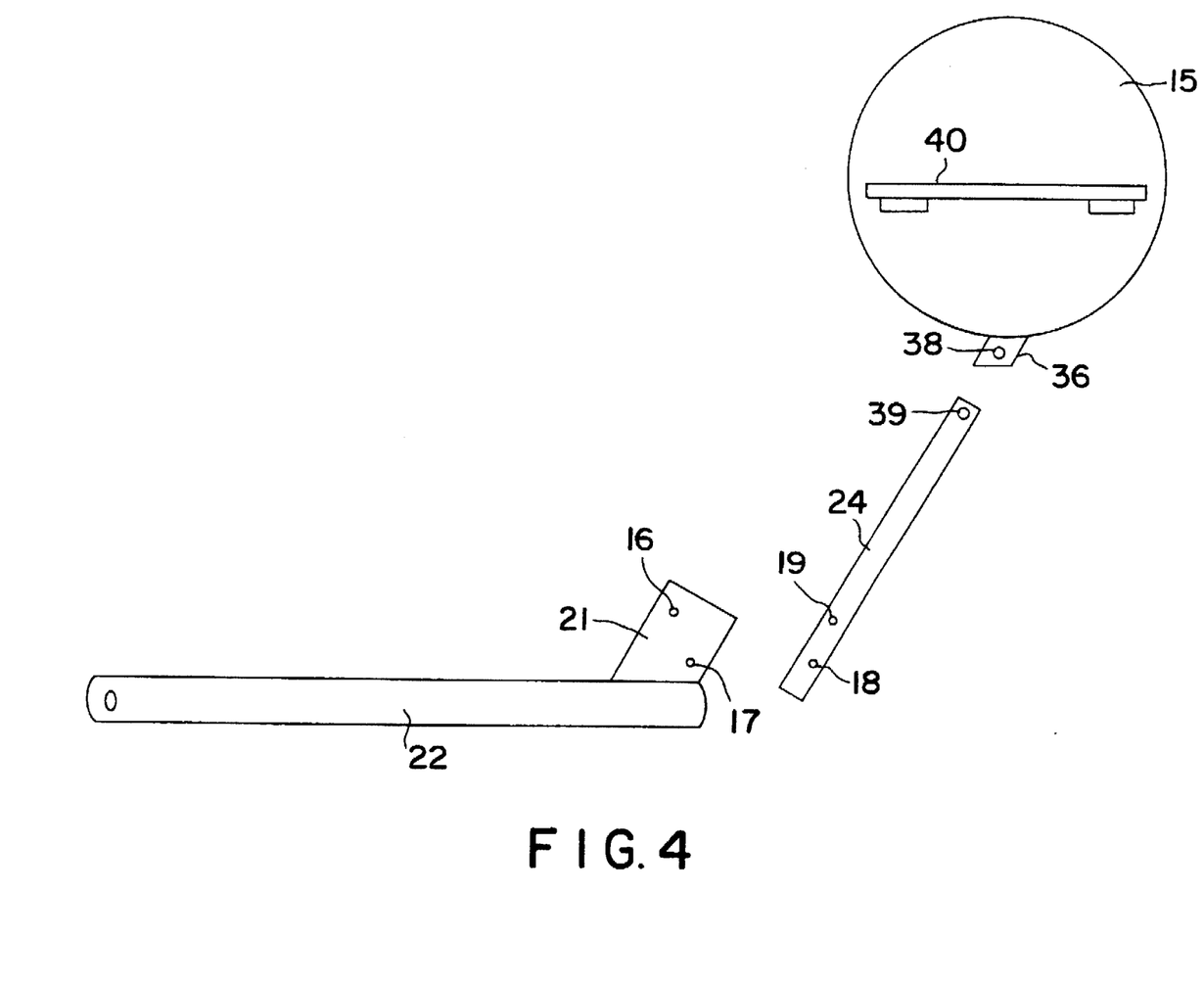
FIG. 4 is an exploded side view of preferred barbecue apparatus.
Figure 5:
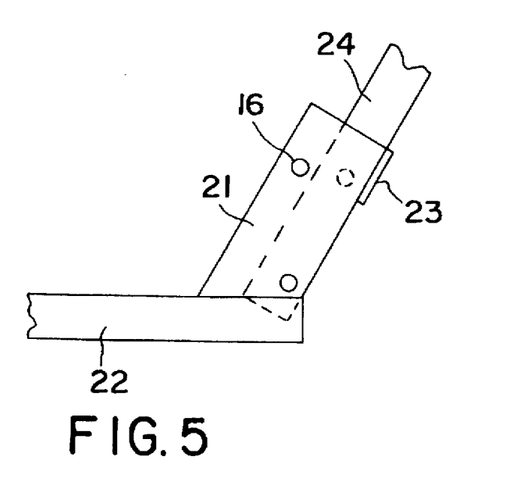
FIG. 5 is an enlarged fragmentary side view of the pivotal joint of the articulated arm illustrating preferred construction details thereof.
Figure 6:
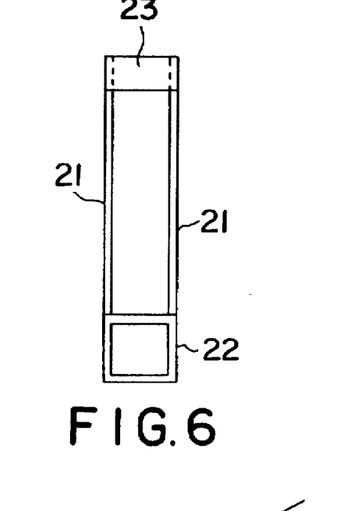
FIG. 6 is a back view of the inner segment of the articulated arm and associated parts illustrating preferred construction details thereof.
Figure 7:
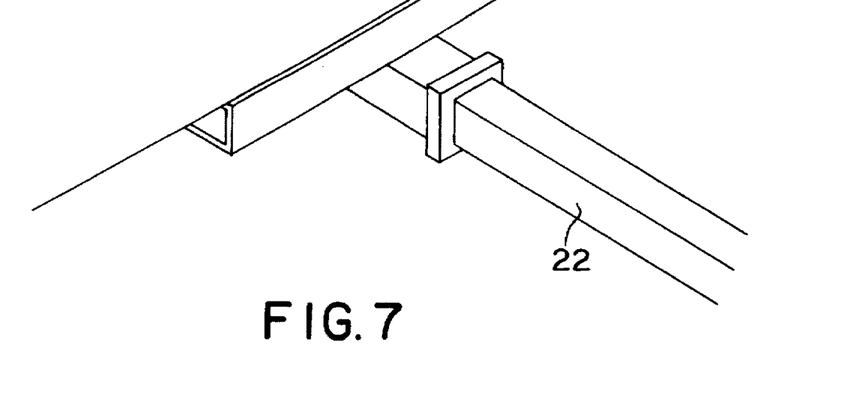
FIG. 7 is a view in perspective showing preferred attachment means for detachably securing and supporting the barbecue apparatus on a vehicle.
Figure 8:
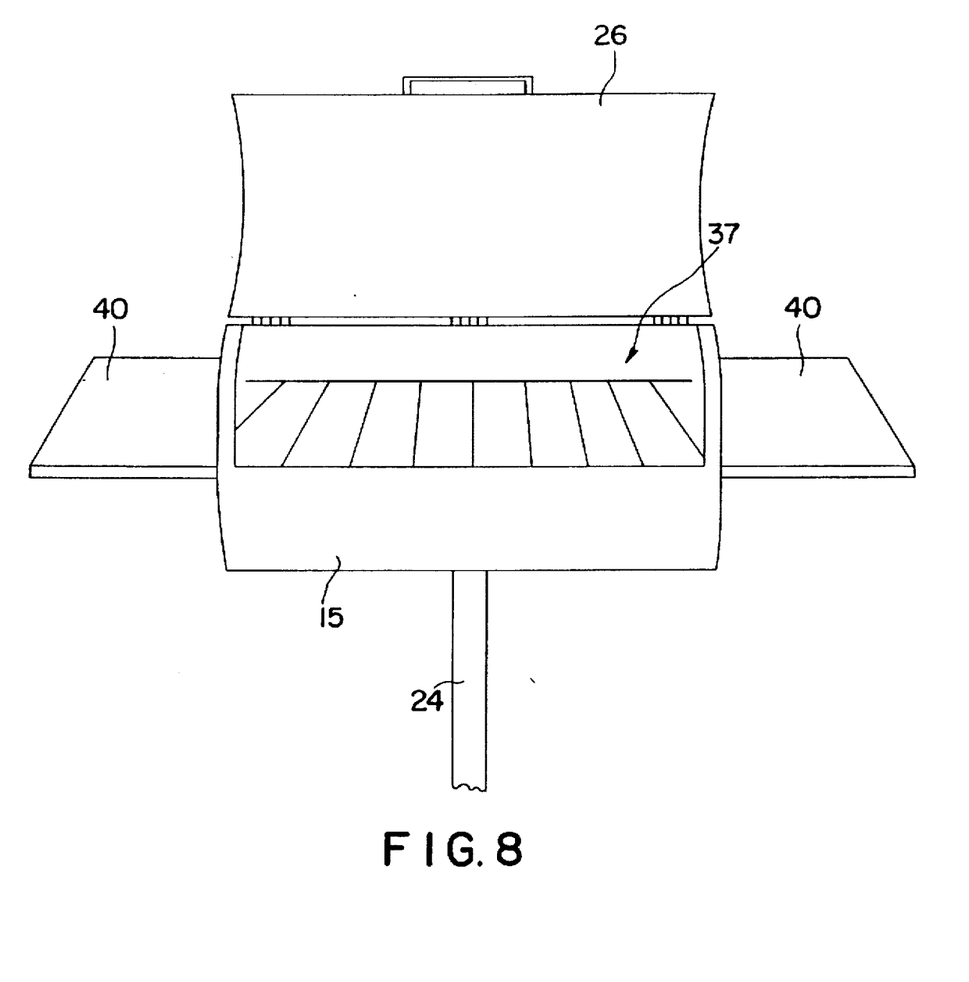
FIG. 8 is a back elevation of preferred barbecue apparatus with the lid in an open position.
Figure 9:
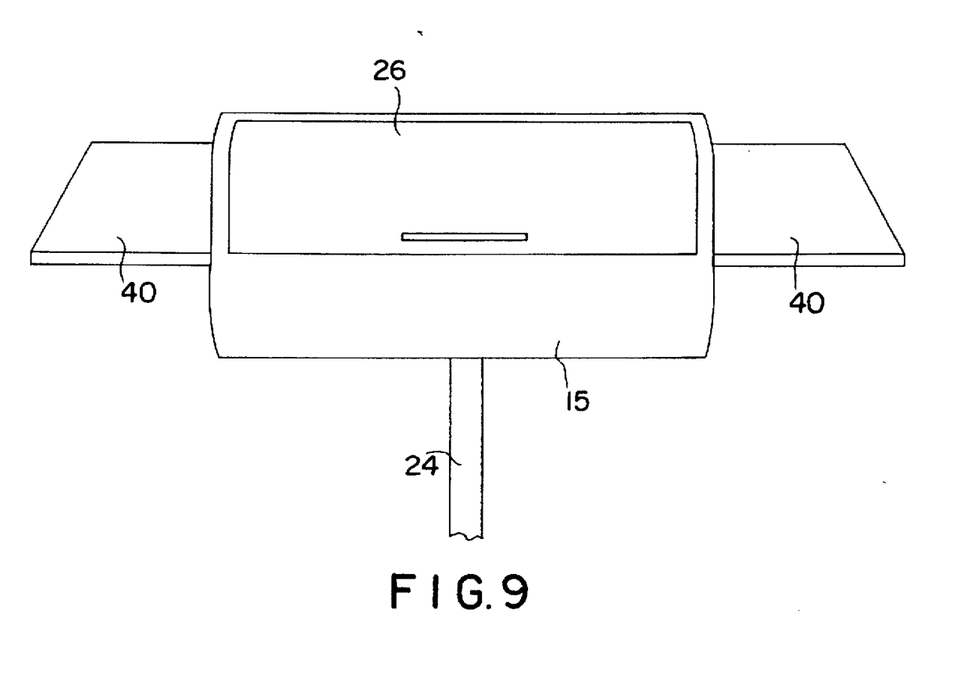
FIG. 9 is a back elevation of a preferred barbecue apparatus with the lid in a closed position.
Figure 10:
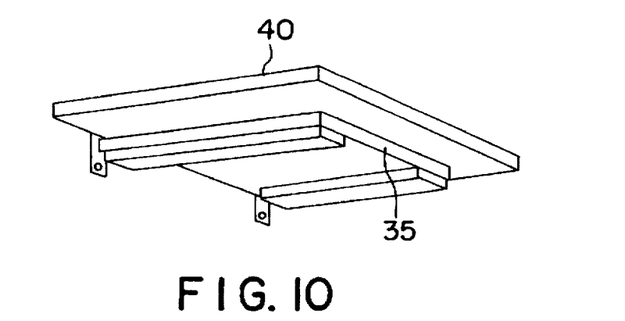
FIG. 10 is a worm's eye view in perspective of the underside of a platform and illustrating a way of attaching the platform to, and supporting it on, a preferred form of barbecue apparatus.

The connections between inner segment 22 and outer segment 24 of articulated arm 20 in a preferred form are illustrated in FIGS. 4, 5 and 6. In this preferred construction, side brackets 21,21 extend upwardly and backwardly at an angle from the outer end portion of inner segment 22. Extending transversely between the upper portions of the back ends of brackets 21,21 and joining them together is a bar or plate member 23 which is disposed rearwardly at a suitable angle from vertical to serve as a stop and brace for outer segment 24 against which segment 24 can rest when the apparatus is disposed in a rearward position as in FIG. 2. Brackets 21,21 each have at least two apertures therein to accommodate a pin or bolt therethrough. Likewise the inner end portion of outer segment 24 also has a pair of apertures extending transversely therethrough. By securing a bolt through the lower aperture 17 of each bracket 21 and also through the lower aperture 18 of segment 24, segments 22 and 24 are pivotally connected together so that segment 24 can be rotated through a limited arc relative to segment 22. When segment 22 is secured in hitch 30, rearward rotation of segment 24 beyond a suitable rearward angle from vertical is prevented by bar or plate member 23. To secure the apparatus when pivoted into a forward position as in FIG. 1, bolt or pin 14 is secured through each upper aperture 16 of each bracket 21 and also through the upper aperture 19 of the inner end portion of segment 24. When the apparatus is pivoted into a rearward position as in FIG. 1, bolt or pin 14 is secured through each upper aperture 16 of each bracket 21 and across the front edge of the inner end portion of segment 24. Thus in this position pin 14 serves as a stop to prevent forward rotation of segment 24 and bar or plate member 23 serves as a stop to prevent rearward rotation of segment 24.

Figure 1:
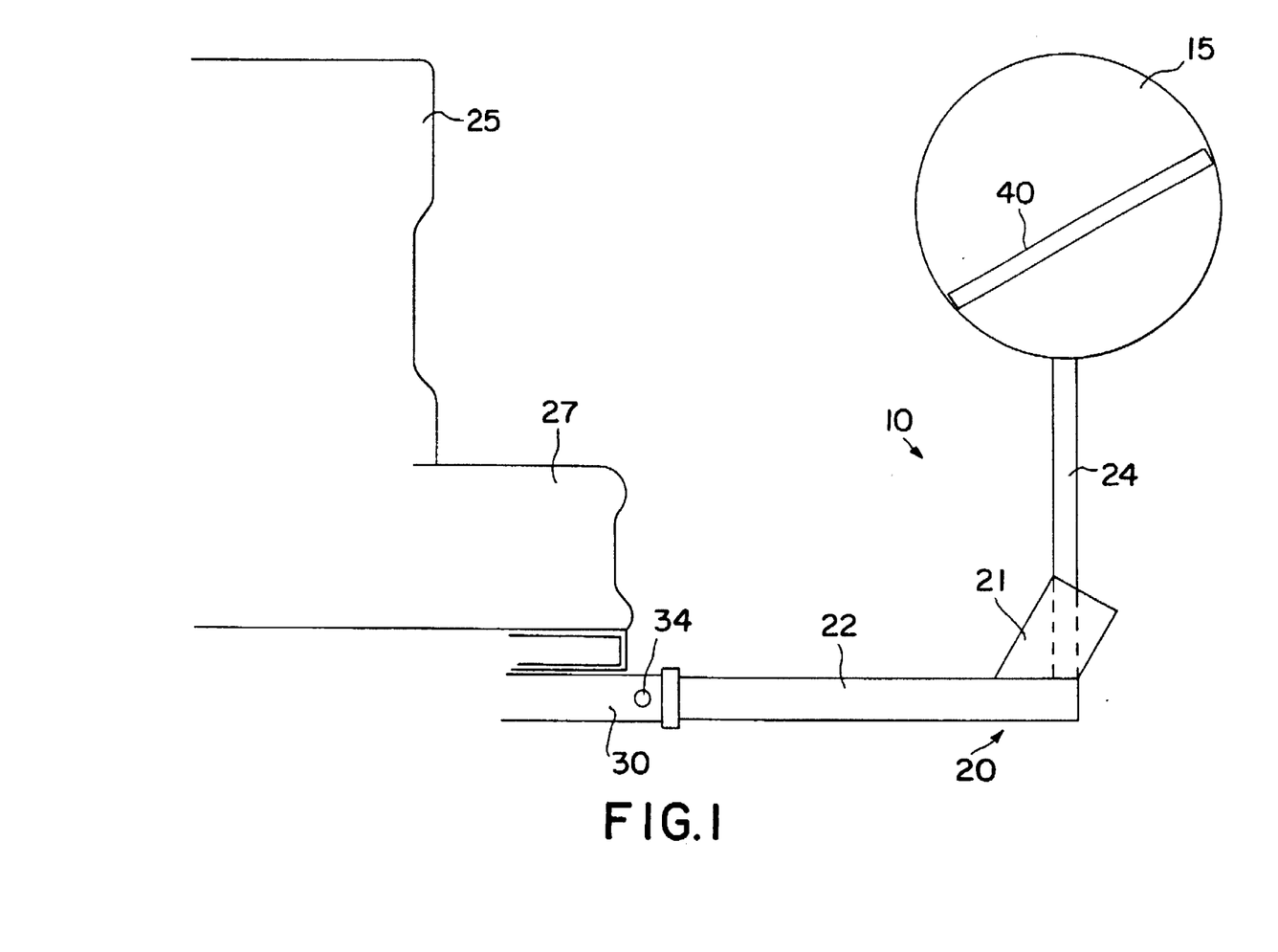
FIG. 1 is a side elevation of a preferred form of barbecue apparatus attached to a motor vehicle and depicted in a forward position for transport.
Figure 2:
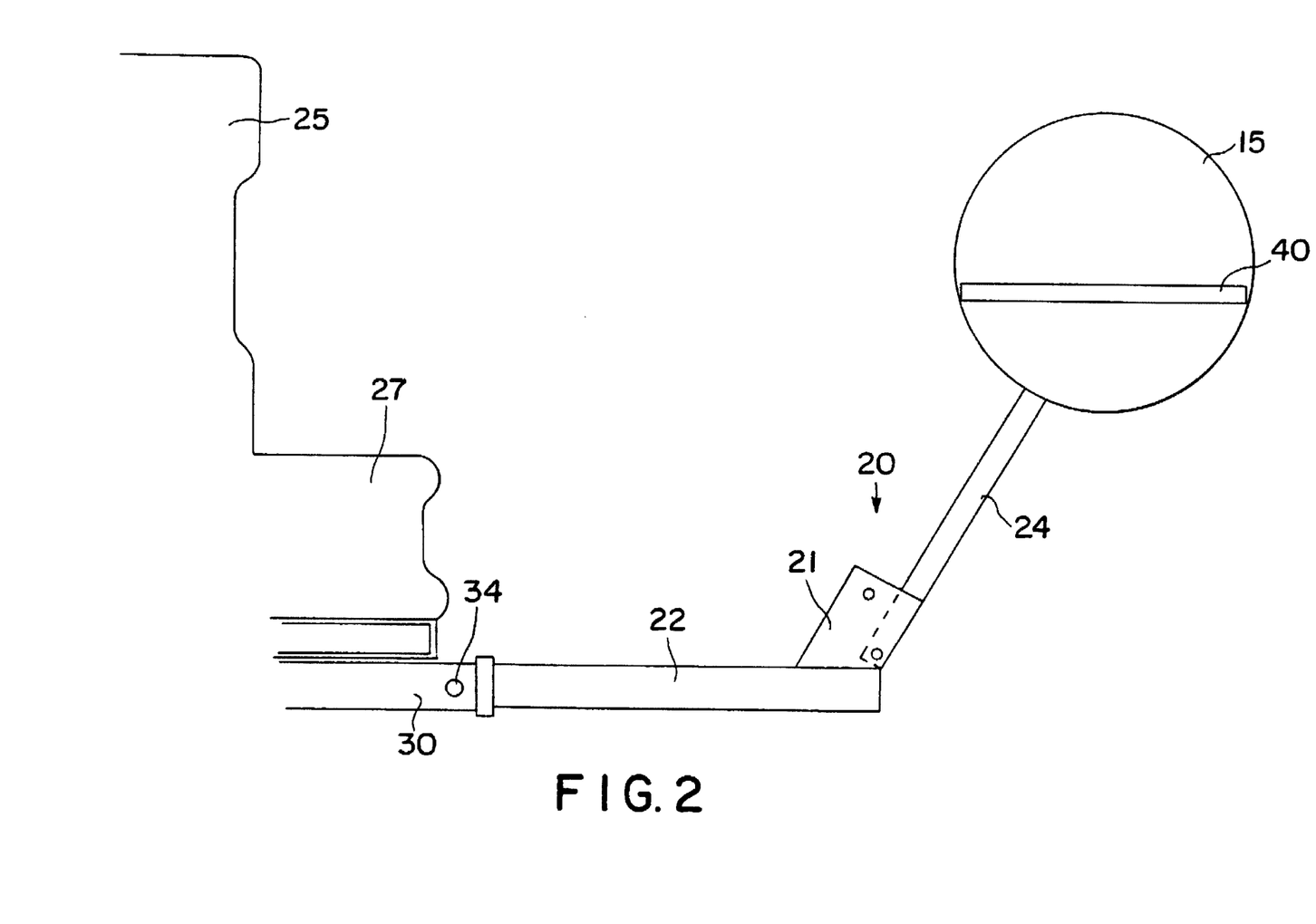
FIG. 2 is a side elevation of a preferred form of barbecue apparatus attached to a motor vehicle and depicted in a rearward position for use.

Brackets 21,21 thus define a channel affixed to segment 22 proximate the back end portion thereof that extends upwardly and rearwardly at an angle from the vertical to receive and detachably secure segment 24 proximate the front end portion thereof in at least one upwardly extending position, and preferably in two upwardly extending positions such as are illustrated in FIGS. 1 and 2. In one of these preferred positions segment 24 extends upwardly to the rear of vertical at an acute angle. In the other of these preferred positions segment 24 extends upwardly either vertically or to the front or rear of vertical at a smaller acute angle. When extending upwardly and rearwardly in a cooking position, segment 24 is typically at an angle in the range of about 10 to about 50 degrees and preferably in the range of about 20 to about 40 degrees relative to vertical. When extending upwardly and more forwardly in a transport position, segment 24 is typically at an angle of up to about 10-15 degrees relative to vertical. The most preferred position for segment 24 when attached to the vehicle during travel is a substantially vertical position.

In the preferred form depicted, the apparatus further includes a platform 40 on each side of the cooker to serve as convenient work surfaces. These platforms are suitably secured to the sides of cooker 15 by means of bracing 35 which in turn can be secured as by bolting to the sides of the cooker.

Cooker 15 is typically equipped with an interior grill 37 which can be supported in any suitable manner above a lower space or pit section in the cooker for holding the fuel, which typically is a solid fuel such as briquettes, charcoal, mesquite, or the like. Also the cooker has a lid 26 which is preferably equipped with an exterior latch and lock mechanism such as a hinged latch and eyelet secured together by a padlock. The apparatus preferably also includes a chimney or vent (not shown). Other ventilating means can be added if desired.

It will be noted from FIGS. 1 and 2 that platforms 40 are affixed such that they are tilted forwardly at an angle when the apparatus is in its forward position, but that they are substantially horizontally disposed when the apparatus is in its rearward cooking position.

Figure 3:
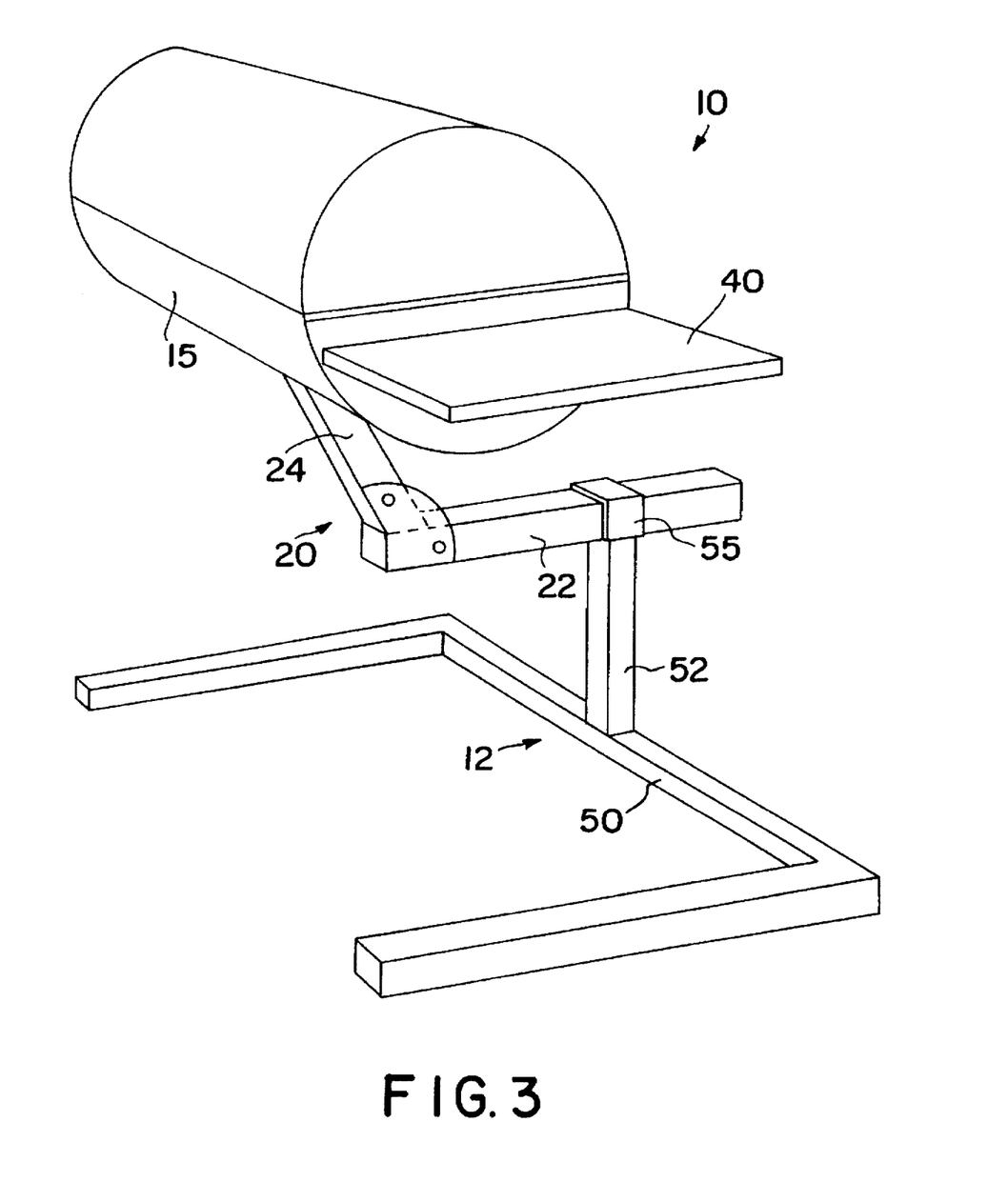
FIG. 3 is a view in perspective of a preferred form of barbecue apparatus depicted in a free-standing mode.

As noted above, when using the apparatus as a freestanding unit, stand 12 is employed. Stand 12 in the form depicted comprises a base 50 and a vertical support arm 52 with a horizontally disposed sleeve 55 affixed to the upper end thereof. Sleeve 55 is sized and configured to slidably receive and suitably secure inner segment 22 therein. Thus by sliding inner segment 22 through sleeve 55 to a suitable point of balance intermediate the ends of the sleeve, the apparatus can be supported and used for cooking entirely apart from the vehicle. If desired, transverse apertures may be suitably placed through segment 22 at one or more locations intermediate its length and also through sleeve 55 to accommodate a bolt or pin in order to further detachably secure the segment and the sleeve together.

It can be seen that the apparatus of this invention can serve a variety of outdoor cooking activities, both at home and away. The apparatus can be readily attached to a vehicle having an appropriate hitching mechanism and transported from place to place and used without detaching the same from the vehicle. By closing and latching the lid the dangers associated with spillage of, or exposure to, hot coals is reduced, if not eliminated. Hot coals after use can be kept in the cooker until they have completely cooled. Also, the problem of disposing of ashes is minimized as the ashes can be transported in the closed and latched cooker until a suitable disposal site is reached. Where space is at a premium, as at crowded camping or picnic grounds or in parking lots of football stadiums, the apparatus is highly advantageous because of the relatively small area it occupies during use. Moreover the problem of trying to find a place to do the cooking, as in parks or other recreational facilities, is avoided or at least greatly reduced. And since the apparatus can be locked onto the vehicle and the contents of the cooker secured by locking down the lid, the problems of theft are at least ameliorated by virtue of this invention.

This invention is susceptible to considerable variation in its practice. Therefore the foregoing description is not intended to limit, and should not be construed as limiting, the invention to the particular forms of the invention described with reference to the Drawings. Rather, what is intended to be covered is as set forth in the ensuing claims and the equivalents thereof permitted as a matter of law.

I claim:

1. Transportable barbecue apparatus for detachable attachment to a land vehicle having a rear transverse member having connection means thereon, said apparatus comprising a barbecue cooker and an articulated support arm having an inner end portion and an outer end portion, said arm (i) adapted to be detachably secured at its inner end portion to said connection means and (ii) secured or adapted to be detachably secured at its outer end portion to said cooker, wherein:

1) said arm comprises (a) a first segment having said inner end portion and a back end portion, (b) a second segment having said outer end portion and a front end portion, and (c) a channel affixed to said first segment proximate the back end portion thereof to extend upwardly and rearwardly at an angle from the vertical to receive and detachably secure said second segment proximate the front end portion thereof in at lease one upwardly extending position: and 2) said articulated arm when detachably secured to said connection means and to said cooker extends rearwardly in a planar zone substantially perpendicular to said transverse member thereby securing said cooker in a preselected position above the land and spaced apart from said vehicle.

2. Apparatus in accordance with claim 1 wherein said channel is adapted to receive and detachably secure said second segment in at least two upwardly extending positions, a first said position extending upwardly to the rear of vertical and a second said position extending upwardly either vertically or at a smaller angle to the front or rear of vertical.

3. Apparatus in accordance with claim 2 wherein said second segment when secured in said first position extends upwardly to the rear of vertical at an acute angle relative to vertical.

4. Apparatus in accordance with claim 3 wherein said second segment when secured in said second position extends upwardly substantially vertically or to the front or rear of vertical at an acute angle in the range of up to about 10 degrees relative to vertical.

5. Apparatus in accordance with claim 1 adapted for detachable attachment to a land vehicle having a tailgate disposed above said rear transverse member, wherein said articulated arm is sized and configured such that when said articulated arm is detachably secured to said connection means and to said cooker and said cooker is in a preselected position above the land and spaced apart from said vehicle, the tailgate of the vehicle can be raised and lowered without physical interference with said apparatus.

6. Apparatus in accordance with claim 1 adapted for detachable attachment to a land vehicle having a liftback disposed above said rear transverse member, wherein said articulated arm is sized and configured such that when said articulated arm is detachably secured to said connection means and to said cooker and said cooker is in a preselected position above the land and spaced apart from said vehicle, the liftback of the vehicle can be raised and lowered without physical interference with said apparatus.

7. Apparatus in accordance with claim 1 wherein said cooker includes a pit section for receiving solid fuel, a cooking grate disposed above the pit section, and a lockable lid having open and closed positions whereby said cooker can be completely closed during transport.

8. Apparatus in accordance with claim 1 further comprising at least one platform detachably attachable to said cooker to provide a substantially horizontal working surface proximate to said cooker when said cooker is in a preselected position above the land and spaced apart from said vehicle.

9. Transportable barbecue apparatus for detachable attachment to a land vehicle having a rear transverse member having connection means thereon, said apparatus comprising (A) a barbecue cooker; (B) an articulated support arm having an inner end portion and an outer end portion, said arm (i) adapted to be detachably secured at its inner end portion to said connection means and (ii) secured or adapted to be detachably secured at its outer end portion to said cooker, wherein said articulated arm when detachably secured to said connection means and to said cooker extends rearwardly in a planar zone substantially perpendicular to said transverse member thereby securing said cooker in a preselected position above the land and spaced apart from said vehicle; and (C) a support stand detachably attachable to said articulated arm to enable use of said cooker as a free standing unit when said arm is not secured to said rear transverse member.

10. Apparatus in accordance with claim 9 wherein said arm comprises (a) a first segment having said inner end portion and a back end portion, (b) a second segment having said outer end portion and a front end portion, and (c) a channel affixed to said first segment proximate the back end portion thereof to extend upwardly and rearwardly at an angle from the vertical to receive and detachably secure said second segment proximate the front end portion thereof in at least one upwardly extending position.

11. Apparatus in accordance with claim 10 wherein said channel is adapted to receive and detachably secure said second segment in at least two upwardly extending positions, a first said position extending upwardly to the rear of vertical and a second said position extending upwardly either vertically or at a smaller angle to the from or rear of vertical.

12. Apparatus in accordance with claim 11 wherein said second segment when secured in said first position extends upwardly to the rear of vertical at an acute angle relative to vertical.

13. Apparatus in accordance with claim 12 wherein said second segment when secured in said second position extends upwardly substantially vertically or to the front or rear of vertical at an acute angle in the range of up to about 10 degrees relative to vertical.

* * * * *

UNITED STATES PATENT AND TRADEMARK OFFICE
CERTIFICATE OF CORRECTION

PATENT NO. : 5,626,126

DATED : May 6, 1997

INVENTOR(S) : Bill McNulty

It is certified that error appears in the above-indentified patent and that said Letters Patent is hereby corrected as shown below:

Claim 11, Column 8, line 6 reads "from" and should read --front--.

Signed and Sealed this

Sixteenth Day of September, 1997

Attest:

BRUCE LEHMAN

*Attesting Officer*     *Commissioner of Patents and Trademarks*